United States Patent [19]
Rainer

[11] 3,787,678
[45] Jan. 22, 1974

[54] RECHARGEABLE BATTERY POWERED LIGHT

[76] Inventor: Robert R. Rainer, 204 Bertly, Moberly, Mo. 65270

[22] Filed: Dec. 13, 1972

[21] Appl. No.: 314,787

[52] U.S. Cl. .......................................... 240/10.6 CH
[51] Int. Cl. ............................................... F211 7/00
[58] Field of Search ............................ 240/10.6 CH

[56] References Cited
UNITED STATES PATENTS
1,506,302  8/1924  Hopkins ...................... 240/10.6 UX
2,818,498  12/1957  Foch ........................... 240/10.6 UX Primary Examiner—Samuel S. Matthews
Assistant Examiner—Michael L. Gellner

[57] ABSTRACT

An improved flashlight that includes D.C. current dry cell batteries which can be readily replaced or which alternately can be easily recharged without need to be removed from the flashlight case; the device including a receptacle in circuit with the batteries, the receptacle being adaptable to receive a plug on an extension cord that can be connected to either a 6 or 12 volt D.C. direct current outlet such as on an automotive vehicle or portable battery charger.

1 Claim, 2 Drawing Figures

PATENTED JAN 22 1974  3,787,678
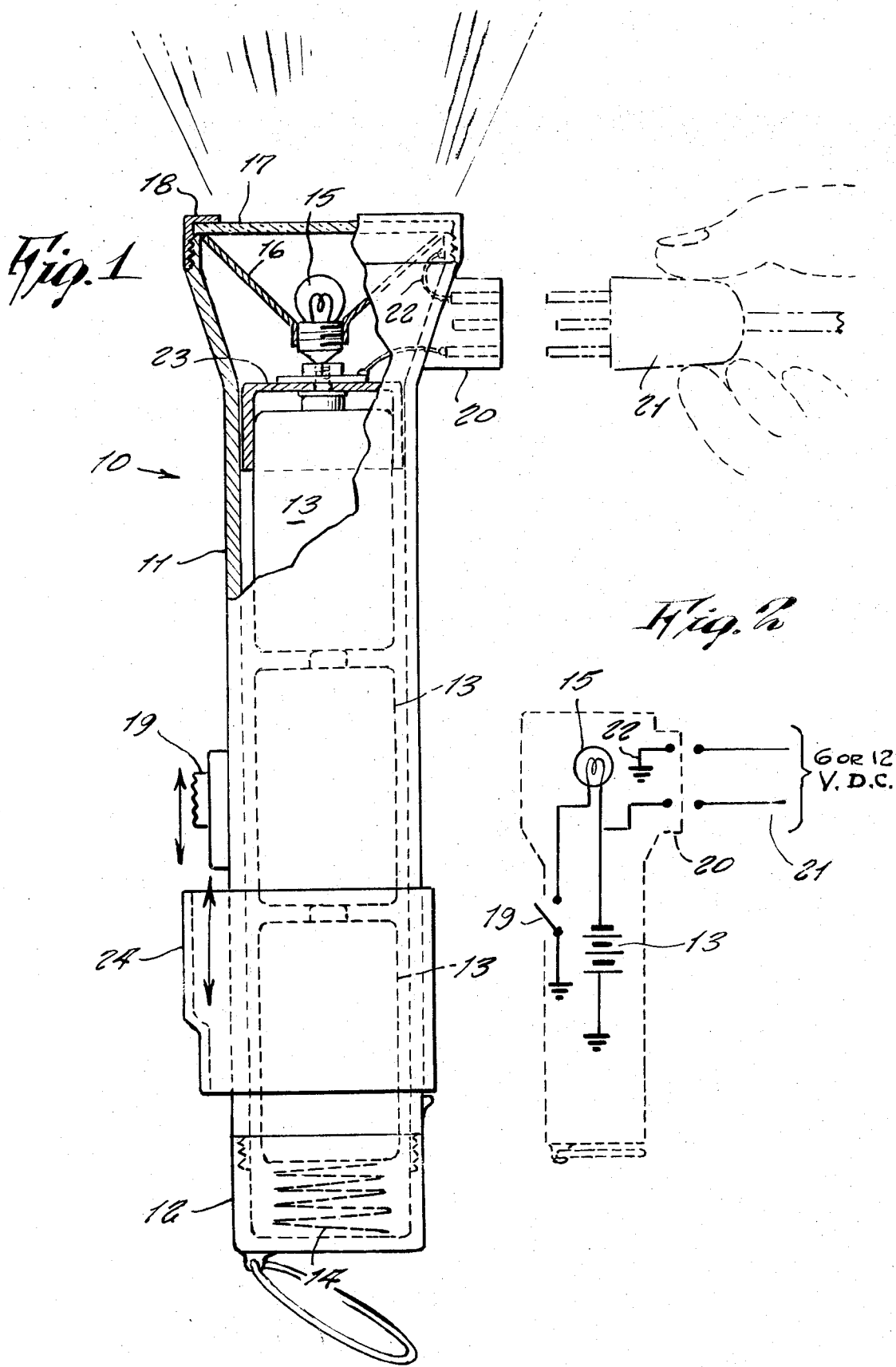

RECHARGEABLE BATTERY POWERED LIGHT

This invention relates generally to flashlights.

A principal object of the present invention is to provide a flashlight which can be readily recharged so that the batteries are always fully charged for instant use.

Another object is to provide a flashlight that can be readily recharged from any D.C. direct current outlet of 6 or 12 volts such as an automotive vehicle or a portable battery charger.

Another object is to provide a flashlight that accordingly eliminates the expense of periodically purchasing new batteries.

Another object is to provide a flashlight in which the batteries do not have to be removed from the case in order to be recharged.

Other objects are to provide a rechargeable battery powered light which is simple in design, inexpensive to manufacture, rugged in construction, easy to use, and efficient in operation.

These and other objects will be readily evident upon a study of the following specification and the accompanying drawing, wherein:

FIG. 1 is a side view of the invention shown partly in cross section.

FIG. 2 is an electrical diagram of the invention.

Referring now to the drawing in detail, the reference numeral 10 represents a rechargeable battery powered light according to the present invention in which there is a case 11 having a removable rear end cap 12 screwed on so to permit installing D.C. current dry cell batteries 13 therewithin. A compression coil spring 14 between the batteries and the end cap provides a ground contact from the batteries to the case.

The other end of the batteries is connected through a battery cover to one terminal of a lamp 15 in the other end of the case. A reflector 16 around the lamp directs light rays out of a lens 17 in front of the lamp and mounted in a bezel 18 screwed on the case end so to allow replacement of the lamp in case it burns out. Another terminal of the lamp is connected to one terminal of an on-off switch 19 mounted on an outer side of the case, the other end of the switch being grounded.

A receptacle 20 formed on a side of the case is adaptable to receive a plug 21 connected to a 6 or 12 volt D.C. power source. One terminal of the receptacle is grounded to the case as shown at 22, and another terminal thereof is connected to the battery cover 23 on the batteries.

A safety cover 24 is slidable along the outer side of the case so to cover up the switch 19 during recharging operation and prevent it accidentally being turned on.

When not plugged in for recharge, the flashlight is readily portable for normal illuminating use.

While various changes may be made in the detail construction, it is understood that such changes will be within the spirit and scope of the present invention as is defined by the appended claims.

One such change different from the construction shown in the drawing, would be that the batteries can be installed into the case from either end.

I claim:

1. In a rechargeable battery powered light, the combination of a case having a removable end cap at a rear end for closing a rear opening in said case, D.C. current dry cell batteries being removably received through said opening into an interior chamber of said case, a lamp in a front end of said case, a switch on a side of said case, said batteries, lamp and switch being in a series electrical circuit, a recharging receptacle on said case for receiving a male plug connected to an external electric power source, said recharging receptacle having terminals electrically connected to opposite terminals of said batteries, and a safety cover being slidable along an outer side of said case so to selectively cover up a normally exposed switch button of said switch during recharging period and preventing said circuit accidentally being closed at such recharging time.

* * * * *